No. 697,929. Patented Apr. 15, 1902.
T. S. YOUNG.
SINGLETREE HOOK.
(Application filed Dec. 2, 1901.)
(No Model.)
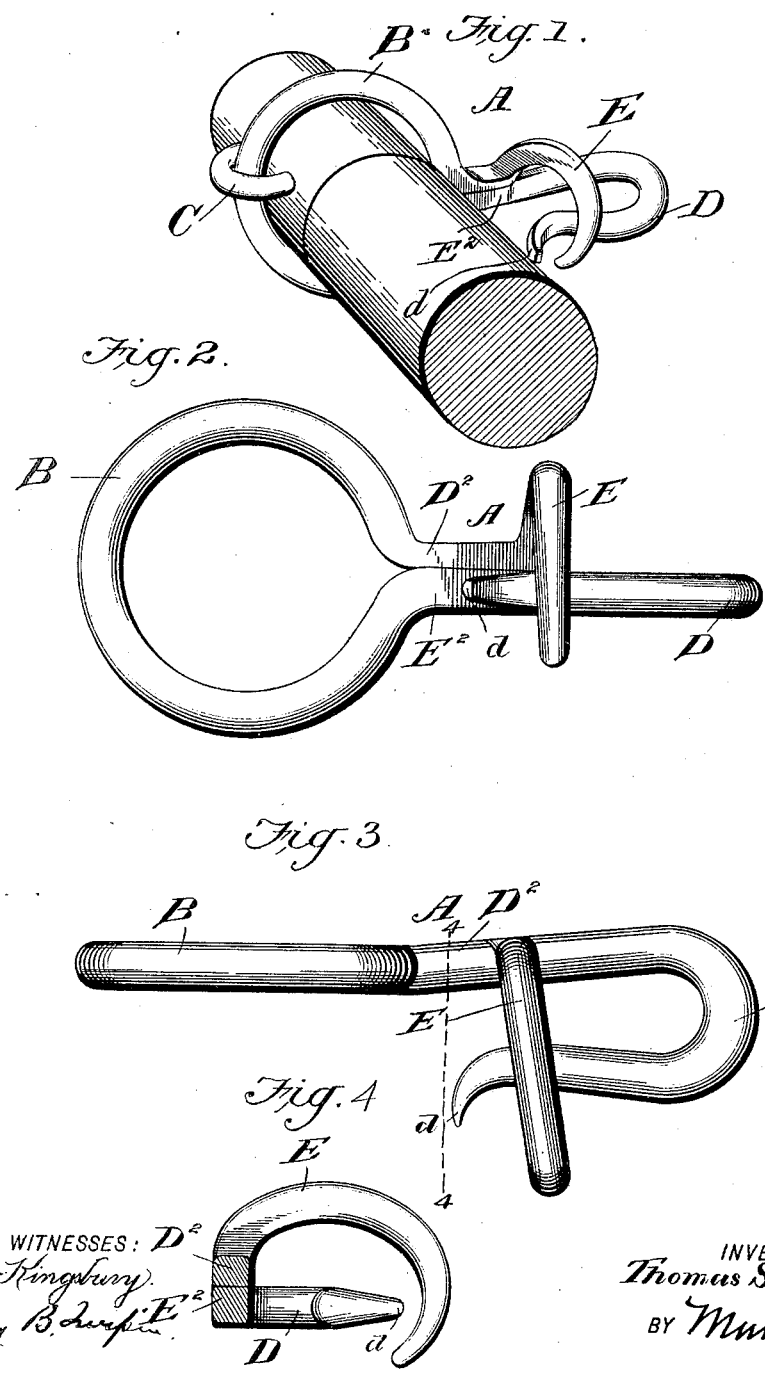

UNITED STATES PATENT OFFICE.

THOMAS S. YOUNG, OF FOSSIL, OREGON.

SINGLETREE-HOOK.

SPECIFICATION forming part of Letters Patent No. 697,929, dated April 15, 1902.

Application filed December 2, 1901. Serial No. 84,343. (No model.)

*To all whom it may concern:*

Be it known that I, THOMAS S. YOUNG, a citizen of the United States, residing at Fossil, in the county of Wheeler and State of Oregon, have made certain new and useful Improvements in Singletree-Hooks, of which the following is a specification.

My invention is an improvement in singletree-hooks, having for an object to provide a novel construction of such hook, including a safety-keeper extending over the hook proper and beyond the same and in which the hook is formed from a single length of metal bent between its ends to form the loop or ring to fit upon the end of the whiffletree and at its ends to provide the hook for engagement by the trace-chain and the safety-keeper overlying said hook, as will be more fully described hereinafter; and the invention consists in certain novel constructions and combinations of parts, as will be hereinafter described and claimed.

In the drawings, Figure 1 is a perspective view of my improved singletree-hook, a portion of the singletree being shown. Fig. 2 is a side elevation of the hook. Fig. 3 is a top plan view of the hook, and Fig. 4 is a cross-sectional view on about line 4 4 of Fig. 3.

In practice the hooks are made rights and lefts, the hook shown being the left-hand hook or that used on the left-hand end of the singletree. The right-hand hook will be similar to that shown in Fig. 1, except that the hook proper and the keeper will extend to the left instead of to the right, as shown in the said figure. The hook A is provided with the loop or ring B to fit upon the end of the whiffletree, where it may be secured by the staple C or in any other suitable manner, as may be desired, and said hook also has the hook proper, D, and the safety-keeper E, as shown in the drawings.

The hook D turns outwardly with respect to the shank $E^2$ and then back, with its extremity $d$ outturned to facilitate the application of the trace-chain, and the safety-keeper E extends laterally from a point overlying the shank $E^2$ of the hook D and projects across the hook D in advance of the free end of the latter and curves downwardly outside of and slightly below the plane of the hook D, the said safety-keeper having a gradual curve or arch toward its free end, which curves inwardly toward a point slightly below the hook proper, as will be understood from the drawings. By this construction all danger of the trace-chain becoming accidentally detached is avoided, and such chain when applied is held securely in engagement with the hook D.

For convenience of manufacture and in order to secure the maximum strength of singletree-hook I prefer to make the device from a single length of metal, which is bent between its ends to form the loop or ring A and extends from said loop with its sections $D^2$ and $E^2$ welded together, as shown, or otherwise united, forming a double thickness or shank adjacent to the ring A, and with the free ends of the rod bent to form one the hook proper and the other the safety-keeper, as shown and before described.

The construction is simple, strong, is applied for use in the ordinary manner, and will operate efficiently to prevent the accidental detachment of the trace-chain.

It will be noticed that the point $d$ of the hook D turns outward until it lies in rear of the safety-keeper, thus preventing the tug, trace-chain, or other device connected with the hook D from becoming detached when forced straight back.

In practice the hook will not clog up with dirt, snow, or ice, and the tug or trace cannot shake loose. While the invention is especially designed for use as a whiffletree-hook, it is manifest it may be employed for other purposes wherever desired.

Having thus described my invention, what I claim as new, and desire to secure by Letters Patent, is—

1. A device substantially as herein described, composed of a rod of metal bent between its ends to form the loop or ring, united immediately adjacent to the said loop or ring and having one extremity bent to form the hook proper, with its end bent outwardly, and the safety-keeper curving laterally outward over the hook proper and extending downwardly to a point outside of and below the plane of the hook proper, substantially as set forth.

2. A device substantially as herein described, provided with the returned hook proper and with a safety-keeper extending from a point adjacent to the shank of the hook laterally across the hook proper and to a point beyond the said hook, substantially as set forth.

3. A device substantially as herein described, comprising the loop or ring, the shank portion extending therefrom, the hook proper and the safety-keeper extending laterally across and to a point beyond the hook proper, substantially as set forth.

4. A device substantially as herein described, comprising the ring or loop, the hook proper and the safety-keeper extending from a point adjacent to the shank of the hook proper and curving thence upwardly and then downwardly to a point above, outside of, and below the hook proper, substantially as set forth.

5. A device substantially as described, composed of a rod of metal bent between its ends to form the ring or loop and at its ends to form the hook proper, and the safety-keeper, substantially as set forth.

THOMAS S. YOUNG.

Witnesses:
  GEO. S. CARPENTER,
  STANLEY D. HERBERT.